United States Patent [19]
Iimura

[11] Patent Number: 5,347,501
[45] Date of Patent: Sep. 13, 1994

[54] SERVO APPARATUS OF AN OPTICAL DISC HAVING CALIBRATION FOR GAIN CONTROL

[75] Inventor: Shinichiro Iimura, Tokyo, Japan

[73] Assignee: Sony Corporation, Japan

[21] Appl. No.: 618,265

[22] Filed: Nov. 21, 1990

[30] Foreign Application Priority Data

Nov. 30, 1989 [JP] Japan .................................. 1-311722

[51] Int. Cl.$^5$ .............................................. G11B 7/00
[52] U.S. Cl. ................................ 369/44.25; 369/44.34; 369/44.35; 369/44.29
[58] Field of Search ............... 369/44.29, 44.21, 44.26, 369/44.35, 58, 44.25, 44.27, 44.34, 54, 44.11, 44.36, 124, 47, 48; 360/77.07

[56] References Cited

U.S. PATENT DOCUMENTS

| | | | |
|---|---|---|---|
| 4,878,135 | 10/1989 | Makino et al. | 360/77.07 |
| 4,942,564 | 7/1990 | Hofer et al. | 369/44.21 |
| 4,951,273 | 8/1990 | Yoshida et al. | 369/44.21 |
| 5,079,757 | 1/1992 | Wachi et al. | 369/58 |
| 5,251,194 | 10/1993 | Yoshimoto et al. | 369/50 |

FOREIGN PATENT DOCUMENTS

0247829 12/1987 European Pat. Off. .
0331475 9/1989 European Pat. Off. .

Primary Examiner—Aristotelis Psitos
Assistant Examiner—Nabil Hindi
Attorney, Agent, or Firm—Ronald P. Kananen

[57] ABSTRACT

A servo apparatus of an optical disc, comprises an amplitude detector for detecting an amplitude of a servo detection signal which was extracted by an optical pickup when servo focusing is operating. A gain control signal generator generates a gain control signal for providing a predetermined relation between the amplitude detected by the amplitude detector and a reference value. A controller holds the gain control signal generated by the gain control signal generator and controls the amplitude of the servo detection signal by the gain control signal upon a recording or reproducing operation by the optical pickup.

11 Claims, 7 Drawing Sheets

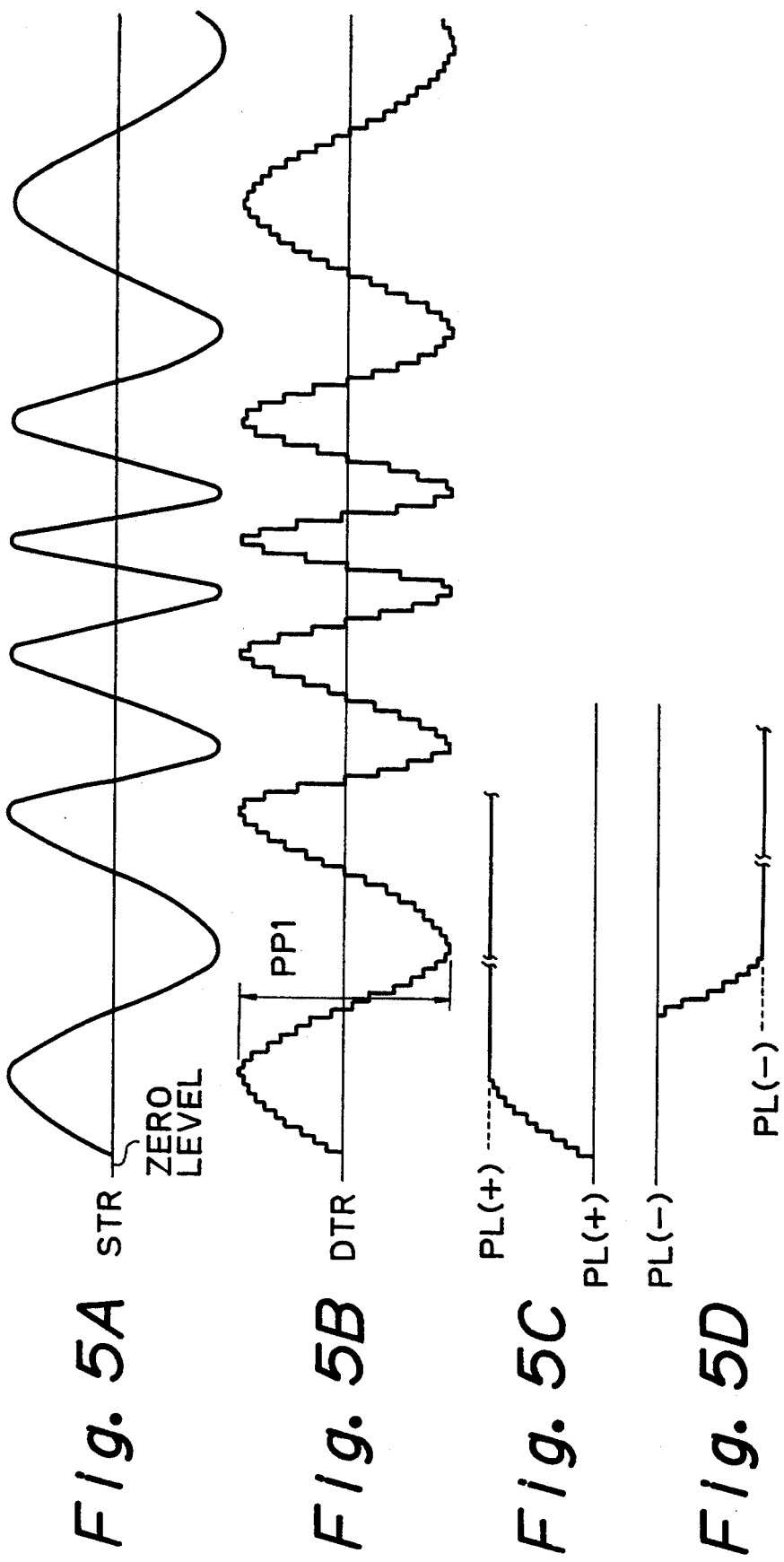

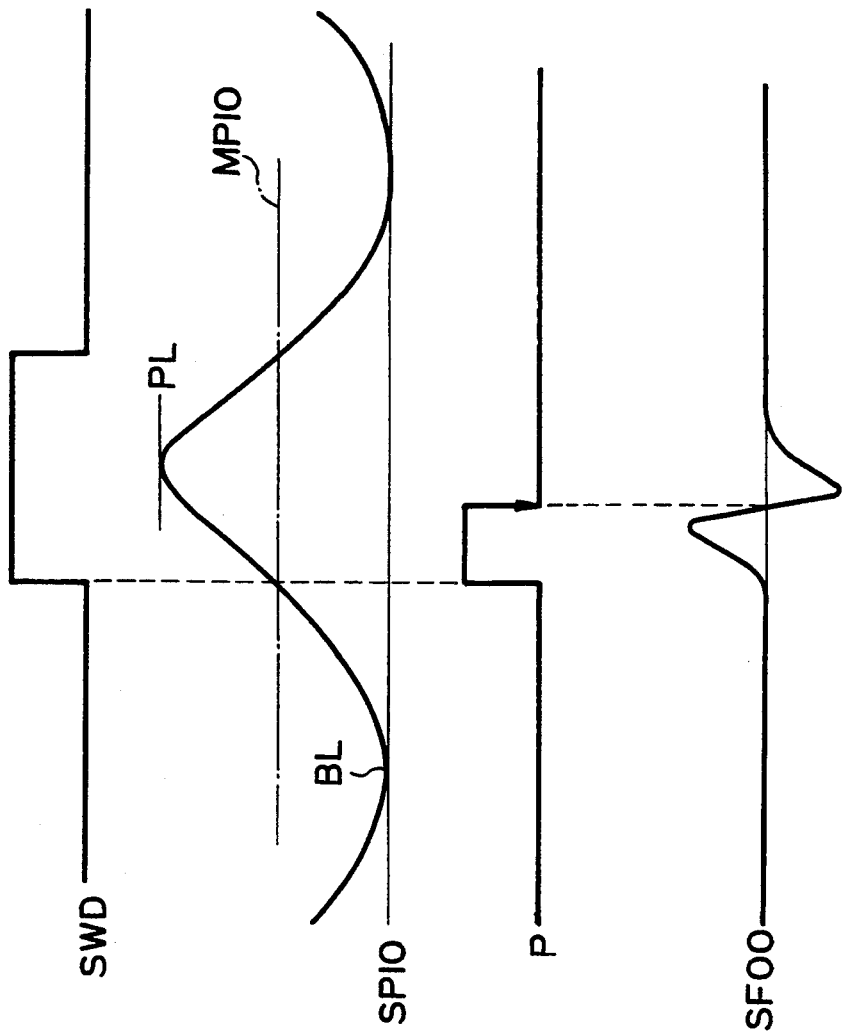

5,347,501

SERVO APPARATUS OF AN OPTICAL DISC HAVING CALIBRATION FOR GAIN CONTROL

BACKGROUND OF THE INVENTION

1. Field of the Invention

The present invention relates to a servo apparatus of an optical disc and, more particularly, to a calibration of a gain of an AGC circuit in the servo system.

2. Description of the Prior Art

A push-pull method, a three-spot method, and the like have been known for a servo control, for instance, for a servo tracking of an optical disc. An AGC is necessary for those servo systems. That is, the AGC is provided to correct a variation in amplitude of a tracking error signal by the optical disc or optical pickup.

A wobbling method has been known as an example of the conventional push-pull type tracking servo. According to the wobbling method, disturbances are applied in a state in which the tracking servo is performed, gains before and after the disturbances are/were applied are compared, and the gain is normalized. However, the above method has problems such that the calibration is difficult because of mutual interferences and the circuit construction becomes very complicated and expensive.

Further, as another AGC in the push-pull method, there is also considered a method whereby a signal which is obtained by dividing a difference between tracking error signals obtained by two 2-divided detectors by the sum of the tracking error signals obtained by the two photo detectors divided into two detecting portion detectors and by using normalizing for the gain control of the AGC circuit.

However, in the case of one beam push-pull, a level change of the difference signal and a level change of the sum signal differ for a depth of groove or a depth of pit, so that there is a problem such that the proper calibration cannot be executed.

OBJECTS AND SUMMARY OF THE INVENTION

It is, therefore, an object of the invention to provide a servo apparatus of an optical disc which can preferably execute a calibration of a servo detection signal by a simple circuit construction.

According to an aspect of the invention, there is provided a servo apparatus of an optical disc, comprising:

amplitude detecting means for detecting an amplitude of a servo detection signal which was extracted by an optical pickup in a state in which a focusing servo is operating;

gain control signal generating means for generating a gain control signal to provide a predetermined relation between the amplitude detected by the amplitude detecting means and a reference value; and control means for holding the gain control signal which is generated by the gain control signal generating means upon a recording or reproducing operation by the optical pickup.

The above, and other, objects, features and advantages of the present invention will become readily apparent from the following detailed description thereof which is to be read in connection with the accompanying drawings.

BRIEF DESCRIPTION OF THE DRAWINGS

FIGS. 5A to 5D are diagrams showing detection and holding of a tracking error signal and its peak level, respectively;

FIGS. 8A to 8D are diagrams showing a pull-in signal and a focusing error signal, respectively.

DETAILED DESCRIPTION OF THE PREFERRED EMBODIMENTS

Figure 1:
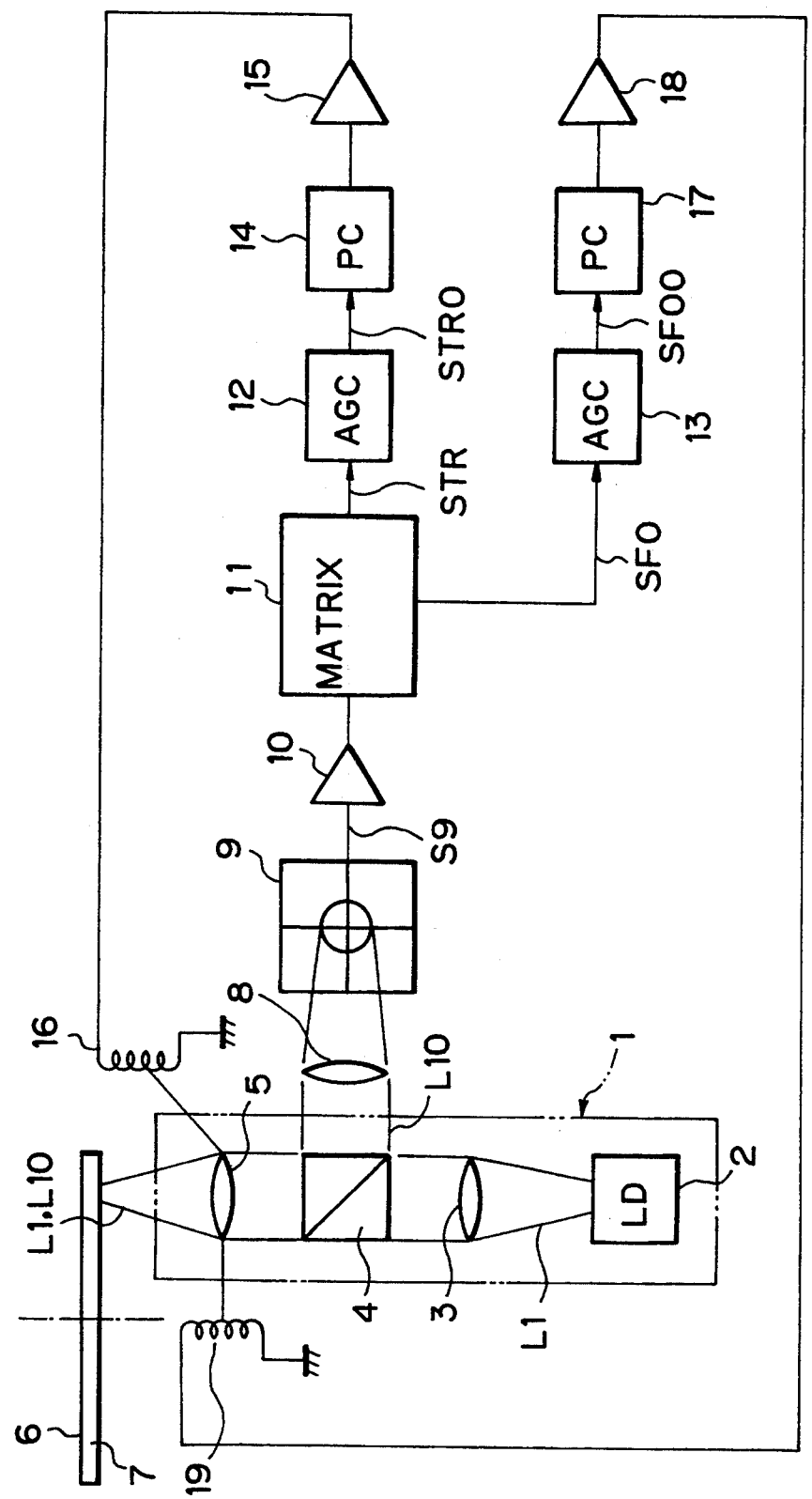
FIG. 1 is a block diagram showing an embodiment of the present invention.

An embodiment of the invention will be described hereinbelow with reference to FIGS. 1 to 6. In the embodiment, an example in which the invention was applied to the servo tracking of an optical disc will be explained. FIG. 1 shows a construction of an optical pickup 1 of the optical disc drive and a servo tracking system and a servo focusing system.

In the optical pickup 1, a laser beam L1 is emitted from a laser diode 2. The laser beam L1 is converted into a parallel beam by a collimating lens 3 and passes through a beam splitter 4. After that, the parallel laser beam is focused by an objective lens 5 onto a surface (hereinafter, referred to as a pit forming surface) 7 of an optical disc 6 on which pits are formed.

A laser beam L10 which was reflected by the pit forming surface 7 of the optical disc 6 passes from the beam splitter 4 through a cylindrical lens 8 and forms an image onto a photo detector 9 divided into four detecting portion.

An output signal S9 from the 4-divided detector 9 is supplied to a matrix circuit 11 through a head amplifier 10.

Figure 3:
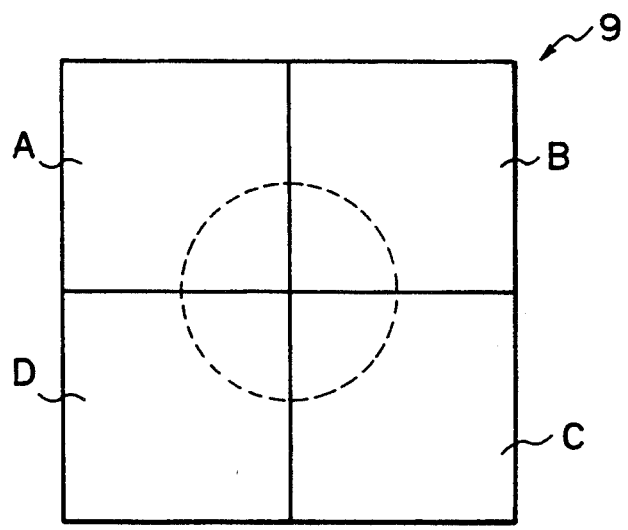
FIG. 3 is a schematic diagram for explaining a 4-divided detector.

In the matrix circuit 11, a tracking error signal STR and a focusing error signal SFO are formed by adding and subtracting levels of output signals S9A to S9D of every area A to D of the detector 9. That is, as shown in FIG. 3, in the respective areas A, B, C, and D, assuming that signals which are formed from beam spots shown by broken lines are set to S9A, S9B, S9C, and S9D, the tracking error signal STR is expressed by the following equation:

$$STR = [(S9A + S9D) - (S9B + S9C)].$$

The focusing error signal SFO, on the other hand, is expressed by the following equation:

$$SFO + [(S9A + S9C) - (S9B + S9D)].$$

The above tracking error signal STR is supplied to an AGC circuit 12. The focusing error signal SFO is supplied to an AGC circuit 13.

In the AGC circuit 12, since the tracking error signal STR is calibrated, a tracking error signal STR0 is obtained from which influences by a decentering of the optical disc 6, a variation of the optical pickup 1, and the like were eliminated. The tracking error signal STR0 passes through a phase compensating circuit 14 and a driving amplifier 15 and is supplied to a tracking coil 16.

In the tracking coil 16, the servo tracking is performed on the basis of the tracking error signal STR0 which is supplied from the driving amplifier 15.

In the AGC circuit 13, a focusing error signal SFO0 from which various influences were eliminated by calibrating the focusing error signal SFO in a manner similar to the above tracking error signal STR0. The focusing error signal SFO0 passes through a phase compensating circuit 17 and a driving amplifier 18 and is supplied to a focusing coil 19.

In the focusing coil 19, the servo focusing is performed on the basis of the focusing error signal SFO0 which is supplied from the driving amplifier 18.

The calibration which is executed prior to executing the recording or reproduction by loading the optical disc 6 will now be explained.

At times an amplitude of a signal which is output from the AGC circuit 12 changes and does not become constant due to causes such as decentering of the optical disc 6, variation in accuracy of the optical pickup 1, and the like. Therefore, it is necessary to calibrate the gain of the AGC circuit 12 before the recording or reproduction is executed to the optical disc 6.

The gain is calibrated in the following manner. First, a coefficient K1 of the calibration of three points corresponding to, for instance, the inner rim, outer rim, and an intermediate position between the inner and outer rims of the optical disc 6 is previously obtained in a state in which only the focusing servo is turned on and the tracking servo is turned off.

Then, by controlling the gain of the AGC circuit 12 by the above coefficient K1 of the calibration during the actual recording or reproducing operation, the influences by the decentering of the track on the optical disc 6, variation of the optical pickup 1, and the like for the tracking error signal STR are eliminated. The calibrated tracking error signals STR and STR0 are obtained.

Figure 2:
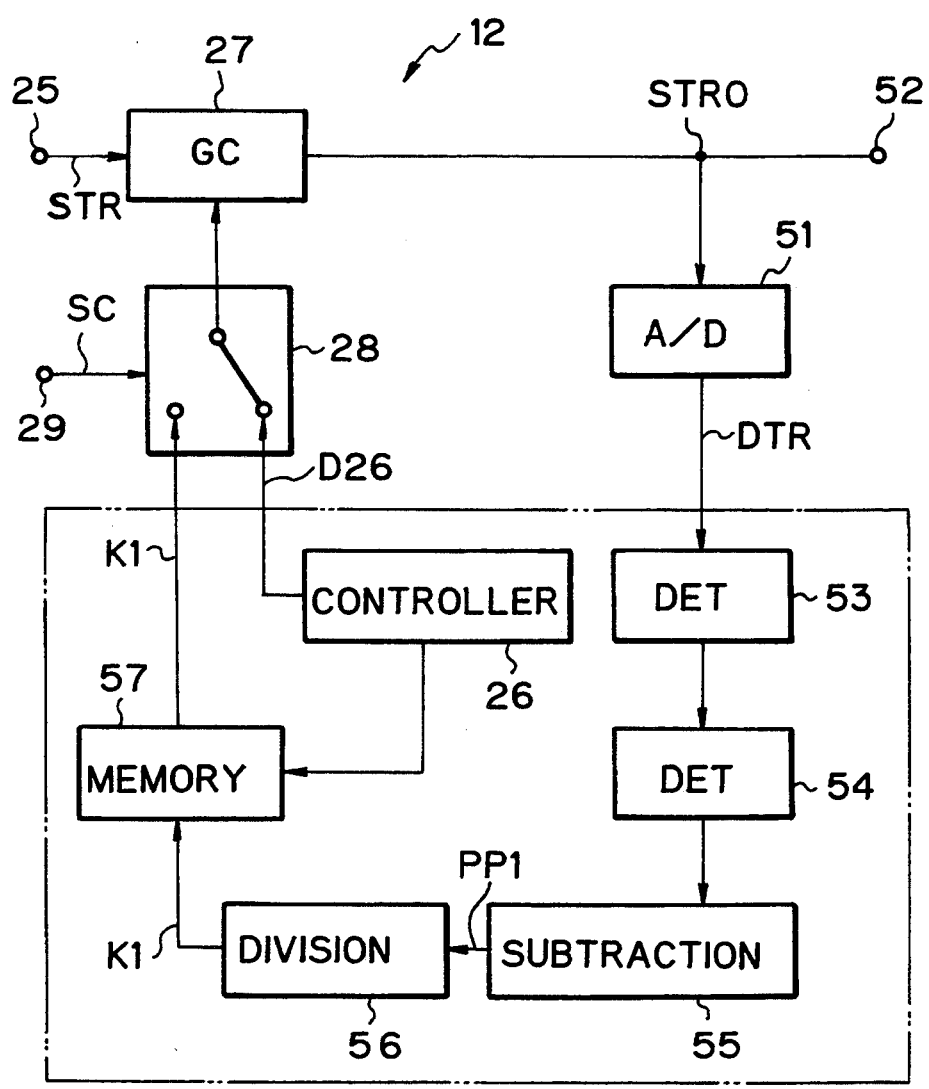
FIG. 2 is a block diagram showing a construction of an AGC circuit.

The tracking error signal STR is supplied from the matrix circuit 11 to the AGC circuit 12. A construction of the AGC circuit 12 is shown in FIG. 2.

The tracking error signal STR which is supplied from a terminal 25 has a waveform, for instance, as shown in FIG. 5A. Since the waveform crosses a plurality of tracks on the optical disc 6 in the OFF state of the servo tracking, the period changes, while intersecting the zero level. The intersection point of the zero level denotes a timing when a beam spot which is irradiated from the pickup 1 crosses the track.

Upon calibration, a control signal D26 which is output from a controller 26 and sets a gain of a gain control amplifier 27 to 1 is selected by a switch 28 and is supplied to the gain control amplifier 27. A signal Sc to control the switching of the switch 28 is supplied through a terminal 29.

Figure 4:
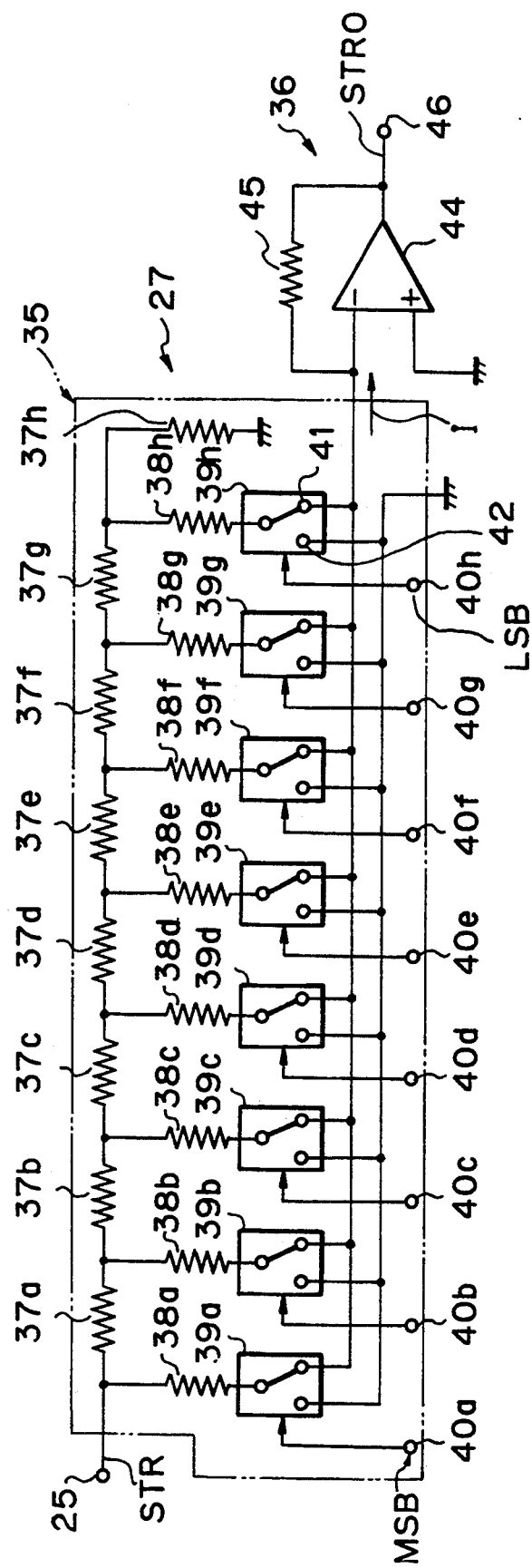
FIG. 4 is a circuit diagram showing a construction of a gain control amplifier.

A construction of the gain control amplifier 27 is shown in FIG. 4. The gain control amplifier 27 has a construction such that a current/voltage converting circuit 36 is provided for a D/A converter 35 using a resistance ladder of R-2R. That is, one end of each of resistors 37a and 38a is connected to the terminal 25 to which the tracking error signal STR is supplied. The other end of the resistor 38a is connected to a switch 39a.

A construction similar to a connecting state of the resistors 37a and 38a and the switch 39a on the side of the most significant bit MSB is used for all bits, from the MSB side to the least significant bit LSB side. Values of resistors 37a to 37g are set to R and values of resistors 37h and 38a to 38h are set to 2R.

Switches 39a to 39h are controlled on the basis of the values of the respective bits of the control signal D26 of eight bits which are supplied from the controller 26 through the switch 28 and terminals 40a to 40h. Each of the switches 39a to 39h is connected to, for instance, the side of a terminal 41 when a certain bit of the control signal D26 is at the high level ("1"), and is connected to a terminal 42 on the ground side when a certain bit of the control signal D26 is at the low level ("0"). Although not described in detail, the above switching operation is similarly executed with respect to all of the switches 39a to 39h. The terminal 42 is connected to the ground and the terminal 41 is connected to the current-/voltage converting circuit 36.

Figure 6:
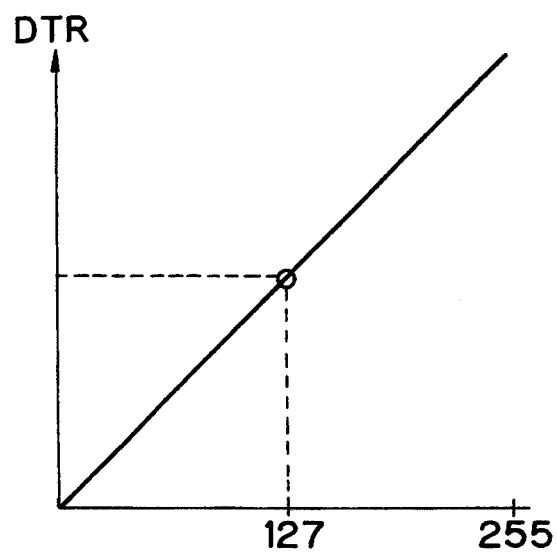
FIG. 6 is a diagram for explaining characteristics of a D/A converter.

The D/A converter 35 has characteristics as shown in FIG. 6. Since the control signal comprises eight bits, a unit of the conversion, that is, a unit of the control is set to (an input voltage)$\times(1/256)$. In this case, since the level of the tracking error signal STR0 which is output is set to at most (an input voltage)$\times(255/256)$, an attenuating operation is performed.

The current/voltage converting circuit 36 is constructed such that a resistor 45 is connected between a (−) side input terminal of an operational amplifier 44 and an output terminal thereof. A current I which is output from the D/A converter 35 is converted into a voltage. The voltage, that is, the tracking signal STR0 is supplied through a terminal 46 to an A/D converter 51 of the AGC circuit 12 and is extracted from a terminal 52. When a value of the resistor 45 of the current/voltage converting circuit 36 is increased by, for instance, n times, the level of the tracking error signal STR0 is also increased by n times.

The tracking error signal STR0 is converted by the A/D converter 51 into a tracking error signal DTR which was quantized as shown in, for instance, FIG. 5B. The tracking error signal DTR is supplied to a positive peak detecting circuit 53, a negative peak detecting circuit 54 and an amplitude is measured.

In the positive peak detecting circuit 53, when a peak on the positive side is detected as shown in FIG. 5C on the basis of the quantized tracking error signal DTR of FIG. 5B, a peak level PL(+) is held. On the other hand, in the negative peak detecting circuit 54, when a peak on the negative side is detected as shown in FIG. 5D on the basis of the quantized tracking error signal DTR of FIG. 5B, a peak level PL(−) is held. The positive side peak level PL(+) and the negative side peak level PL(−) are supplied to a subtracting circuit 55.

In the subtracting circuit 55, a peak value PP1 (Peak to Peak) is obtained. That is, the peak value PP1 is calculated by the following equation and the peak value PP1 is supplied to a dividing circuit 56.

$$PP1 = [PL(+) - PL(-)]$$

In the dividing circuit 56, an inverse number is calculated by dividing the peak value PP1 by a predetermined reference value Ref1, so that the coefficient K1 as a gain control signal is obtained.

$$K1 = [1/(PP1/Ref1)] = (Ref1/PP1)$$

If Ref1 < PP1 in the above equation, the coefficient k1 is set to $K1 \leq 1$. The coefficient K1 is stored into a memory 57.

A microprocessor can be also used as a circuit block in a range which is surrounded by an alternate long and short dash line such as positive peak detecting circuit 53, negative peak detecting circuit 54, subtracting circuit 55, dividing circuit 56, memory 57, controller 26, and the like.

After the above calibration was executed at, for instance, three points corresponding to the inner rim, outer rim, and intermediate position between the inner and outer rims of the optical disc 6, the ordinary recording or reproducing operation is started.

Upon recording or reproduction, the value of the coefficient K1 corresponding to the position of the optical disc 6 which was obtained by the above calibration is output from the memory 57 on the basis of the control of the controller 26 and is supplied to the gain control amplifier 27 through the switch 28.

In the gain control amplifier 27, by controlling the switches 39a to 39h of the gain control amplifier 27 by the value of the coefficient K1 mentioned above, the value of the coefficient K1 is multiplied to the tracking error signal STR which is supplied to the terminal 25. Therefore, an amplitude of the tracking error signal STR0 which is output is calibrated.

Due to this, even if decentering occurred in a track on the optical disc 6, the calibration can be performed and the servo tracking can be executed.

Figure 7:
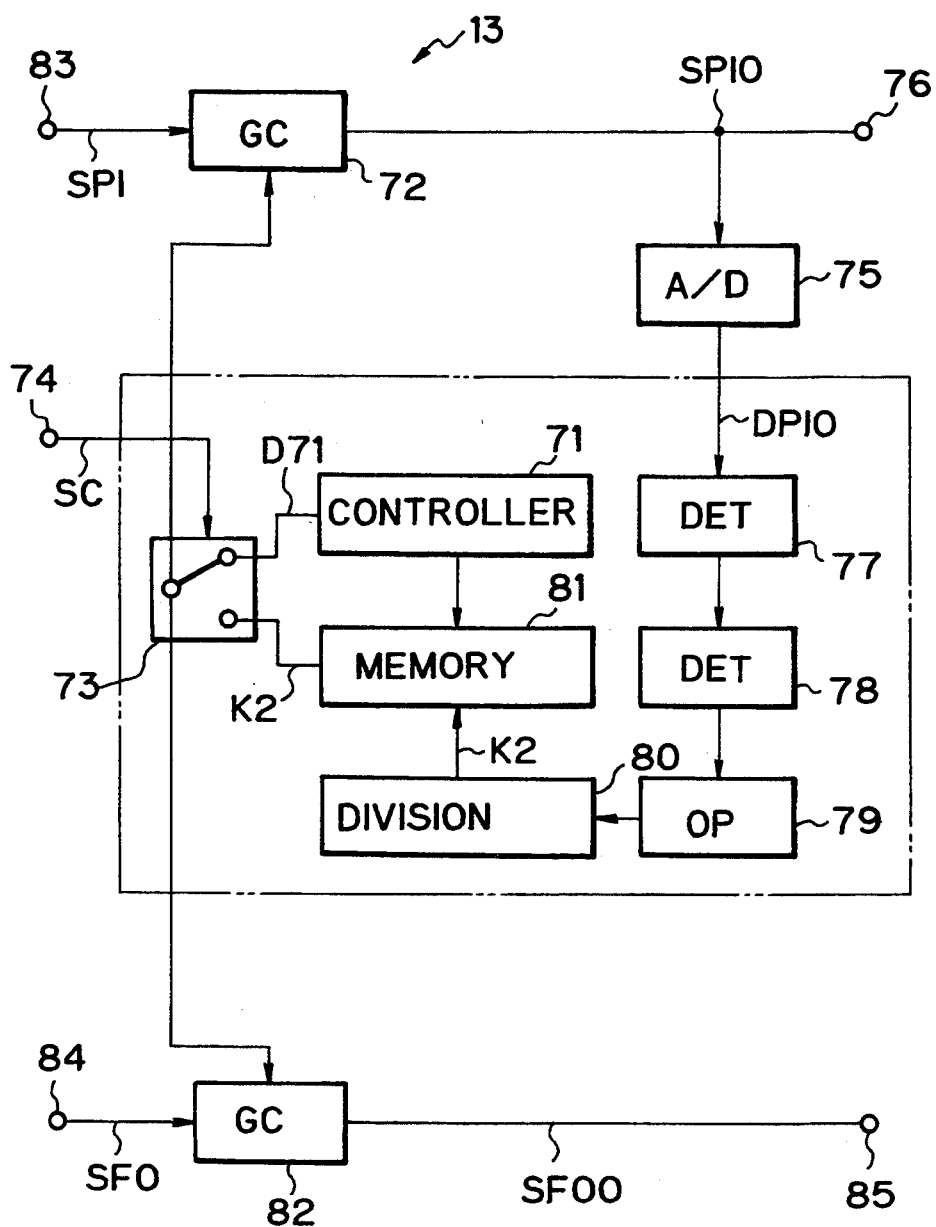
FIG. 7 is a circuit diagram showing a construction of an AGC circuit of another embodiment of the invention.

Another embodiment of the invention is shown in FIGS. 7 and 8. Another embodiment will be explained with respect to an example in the case where the invention was applied to the servo focusing of the optical disc.

Another embodiment differs from the foregoing embodiment with respect to the following points. That is, only a construction of the AGC circuit 13, a signal which is used for the servo control, and that both of the servo focusing and the servo tracking are turned on upon calibration differ from the previous embodiment. Since the other construction is similar to the above embodiment, the overlapping descriptions are omitted.

In the case of the servo focusing, a process similar to the case of the tracking error signal STR is executed by using a pull-in signal SPI. The pull-in signal SPI is supplied to the AGC circuit 13. The pull-in signal SPI corresponds to the sum of the output signals S9A to S9D which are derived from the areas A to D of the detector 9 and corresponds to a signal to obtain the pull-in timing of the focusing servo and also corresponds to a DC component of an RF signal.

A construction of the AGC circuit 13 is shown in FIG. 7.

Upon calibration, a control signal D71 which is output from a controller 71 and sets a gain of a gain control amplifier 72 to 1 is selected by a switch 73 and is supplied to gain control amplifiers 72 and 82. The signal Sc to control the switching of the switch 73 is supplied through a terminal 74.

The pull-in signal SPI is set to a pull-in signal SPI0 through the gain control amplifier 72 whose gain is equal to 1. The pull-in signal SPI0 is supplied to an A/D converter 75 and is extracted from a terminal 76.

The above-mentioned pull-in signal SPI0 is set to a pull-in signal DPI0 which was quantized by the A/D converter 75. The pull-in signal DPI0 is supplied to a peak detecting circuit 77, a bottom detecting circuit 78 and an amplitude is measured.

In the peak detecting circuit 77, a peak is detected on the basis of the quantized pull-in signal DPI0 and a peak level PL is held. On the other hand, in the bottom detecting circuit 78, a bottom is detected on the basis of the quantized pull-in signal DPI0 and a bottom level BL is held. The peak level PL and the bottom level BL are supplied to an operating circuit 79.

In the operating circuit 79, a mean value MPI0 of the pull-in signal DPI0 is obtained. That is, the mean value MPI0 is obtained by the calculation of the equation below and is supplied to a dividing circuit 80.

$$MPI = [(peak\ level\ PL - bottom\ level\ BL) \div 2]$$

In the dividing circuit 80, an inverter number is calculated by dividing the mean value MPI0 by a predetermined reference value Ref2, so that a coefficient K2 as a gain control signal is obtained.

$$K2 = [1/MPI0/Ref2)] = (Ref2/MPI0)$$

If Ref2 < MPI0, the coefficient K2 is set such that $K2 \leq 1$ and the coefficient K2 is supplied to a memory 81. Since constructions of the gain control amplifiers 72 and 82 are similar to the gain control amplifier 27 in the above embodiment, the overlapping descriptions are omitted. On the other hand, the pull-in signal SPI is supplied to a terminal 83 on the input side. The focusing error signal SFO is supplied to a terminal 84. The gain controlled pull-in signal SPI0 is extracted from the terminal 76. The focusing error signal SFO0 is extracted from a terminal 85.

In a circuit at the next stage on the output side of the AGC circuit 13, the pull-in signal SPI0 shown in FIG. 8B is sampled within a width of a window signal SWD shown in FIG. 8A. When the pull-in signal SPI0 reaches a predetermined level, a pulse P shown in FIG. 8C is formed and the servo focusing is executed by using the pulse P and the focusing error signal SFO0.

After the above calibration was executed at three points corresponding to the inner rim, outer rim, and the intermediate position between the outer and inner rims of the optical disc 6, the ordinary recording or reproducing operation is started.

Upon recording or reproduction, the value of the coefficient K2 corresponding to the position on the optical disc 6 which was obtained by the above calibration is output from the above memory 81 on the basis of the control of the controller 71 and is supplied to the gain control amplifiers 72 and 82 through the switch 73.

In the gain control amplifiers 72 and 82, the value of the coefficient K2 is multiplied to an amplitude of the pull-in signal SPI which is supplied to the terminal 83 and to an amplitude of the focusing error signal SFO which is supplied to the terminal 84. Therefore, amplitudes of the pull-in signal SPI0 and the focusing error signal SFO0 which are output are calibrated.

In another embodiment, the servo tracking has been set to ON. However, the invention can be also embodied in the OFF state. On the other hand, although another embodiment has been described with respect to an example in which the calibration is previously executed, the invention is not limited to it and the calibration can be also performed in a real-time manner while rotating the optical disc 6.

According to the servo apparatus of the optical disc of the invention, there are effects such that the servo detection signal can be calibrated without being influenced by disturbances such as noises and the like by a simple circuit construction and the invention be applied to all of the servo tracking methods.

What is claimed is:

1. A servo apparatus of an optical disc, comprising:
   amplitude detecting means for detecting an amplitude of a servo detection signal which was extracted by an optical pickup in a state in which a servo focusing is operating;
   gain control signal generating means for generating a gain control signal to provide a predetermined relation between the amplitude detected by said amplitude detecting means and a reference value when said servo focusing is operating; and
   control means for holding the gain control signal which is generated by said gain control signal generating means and for controlling the amplitude of the servo detection signal by the gain control signal upon a recording or reproducing operation by the optical pickup;
   wherein when said servo focusing is operating, the gain control signal generating means generates gain control signals corresponding to at least three points, the inner rim, outer rim, and an intermediate position between the inner and outer rims of an optical disc, and has memory means for storing gain control signals corresponding to at least the three points which were obtained before the recording or reproducing operation by the optical pickup has started.

2. A servo apparatus of an optical disc according to claim 1, wherein said control means controls the amplitude of the servo detection signal by multiplying the gain control signal with the servo detection signal.

3. A servo tracking apparatus of an optical disc, comprising:
   amplitude detecting means for detecting an amplitude of a tracking error signal which was formed on the basis of a detection output from photodetecting means of an optical pickup in a state in which a servo focusing is operating;
   gain control signal generating means for generating a gain control signal to provide a predetermined relation between a detection output from the amplitude detecting means and a reference value when said servo focusing is operating; and
   control means for holding the gain control signal from the gain control signal generating means and for controlling the amplitude of the servo tracking signal which is supplied to the optical pickup by the gain control signal upon a recording or reproducing operation by the optical pickup;
   wherein when said servo focusing is operating, said gain control signal generating means generates gain control signals corresponding to at least three points: the inner rim, outer rim, and an intermediate position between the inner and outer rims of the optical disc and has memory means for storing gain control signals corresponding to the at least three points which were obtained before the recording or reproducing operation by the optical pickup has started.

4. A servo tracking apparatus of an optical disc according to claim 3, wherein said amplitude detecting means comprises peak value detecting means for detecting a peak value of the tracking error signal.

5. A servo tracking apparatus of an optical disc according to claim 3, wherein said control means multiplies said gain control signal from the gain control signal generating means with the tracking error signal.

6. A servo tracking apparatus of an optical disc, comprising:
   amplitude detecting means for detecting an amplitude of a tracking error signal which was formed on the basis of a detection output from photodetecting means of an optical pickup in a state in which a servo focusing is operating;
   gain control signal generating means for generating a gain control signal to provide a predetermined relation between a detection output from the amplitude detecting means and a reference value when said servo focusing is operating; and
   control means for holding the gain control signal from the gain control signal generating means and for controlling the amplitude of the servo tracking signal which is supplied to the optical pickup by the gain control signal upon a recording or reproducing operation by the optical pickup;
   wherein when said servo focusing is operating, said gain control signal generating means generates gain control signals corresponding to at least three points: the inner rim, outer rim, and an intermediate position between the inner and outer rims of the optical disc and has memory means for storing gain control signals corresponding to the at least three points which were obtained before the recording or reproducing operation by the optical pickup has started;
   wherein said amplitude detecting means comprises peak value detecting means for detecting a peak value of the tracking error signal; and
   wherein said gain control signal generating means operates such that after the peak value detected by said peak value detecting means is received and divided by a predetermined reference value, an inverse number of a resultant value of the division is calculated and generated as the gain control signal.

7. A servo focusing apparatus of an optical disc, comprising:
   amplitude detecting means for detecting an amplitude of a focusing error signal which was formed on the basis of a detection output from divided detectors of an optical pickup in a state in which a servo focusing and a servo tracking are operating;
   gain control signal generating means for generating a gain control signal to provide a predetermined relation between a detection output from said amplitude detecting means and a reference value when said servo focusing and said servo tracking are operating; and
   control means for holding the gain control signal from said gain control signal generating means and for controlling the amplitude of the servo focusing signal which is supplied to the optical pickup by the gain control signal upon a recording or reproducing operation by the optical pickup;

wherein when said servo focusing and said servo tracking are operating, said gain control signal generating means generates gain control signals corresponding to at least three points: the inner rim, outer rim, and an intermediate position between the inner and outer rims of the optical disc and has memory means for storing gain control signals corresponding to the at least three points which were obtained before the recording or reproducing operation by the optical pickup has started.

8. A servo focusing apparatus according to claim 7, wherein said gain control signal generating means has memory means for storing gain control signals corresponding to at least three points, the inner rim, outer rim, and an intermediate position between the inner and outer rims of the optical disc, which were obtained before the recording or reproducing operation by the optical pickup has started.

9. A servo focusing apparatus according to claim 7, wherein said amplitude detecting means comprises peak value detecting means for detecting a peak value and a bottom value of a sum signal from the divided detectors.

10. A servo focusing apparatus according to claim 7, wherein said control means multiplies the gain control signal from said gain control signal generating means to each of the focusing error signal and a sum signal from the divided detectors.

11. A servo focusing apparatus of an optical disc, comprising:
   amplitude detecting means for detecting an amplitude of a focusing error signal which was formed on the basis of a detection output from divided detectors of an optical pickup in a state in which a servo focusing and a servo tracking are operating;
   gain control signal generating means for generating a gain control signal to provide a predetermined relation between a detection output from said amplitude detecting means and a reference value when said servo focusing and said servo tracking are operating; and
   control means for holding the gain control signal from said gain control signal generating means and for controlling the amplitude of the servo focusing signal which is supplied to the optical pickup by the gain control signal upon a recording or reproducing operation by the optical pickup;
   wherein when said servo focusing and said servo tracking are operating, said gain control signal generating means generates gain control signals corresponding to at least three points: the inner rim, outer rim, and an intermediate position between the inner and outer rims of the optical disc and has memory means for storing gain control signals corresponding to the at least three points which were obtained before the recording or reproducing operation by the optical pickup has started;
   wherein said amplitude detecting means comprises peak value detecting means for detecting a peak value and a bottom value of a sum signal from the divided detectors; and
   wherein said gain control signal generating means operates such that after an average value of the peak values which were detected by the peak value detecting means is received and divided by a predetermined reference value, an inverse number of a resultant value of the division is calculated and generated as the gain control signal.

* * * * *